United States Patent
Noyranen et al.

(10) Patent No.: US 8,725,883 B2
(45) Date of Patent: May 13, 2014

(54) METHOD FOR THE ESTABLISHING OF PEER-TO-PEER MULTIMEDIA SESSIONS IN A COMMUNICATION SYSTEM

(75) Inventors: Janne Esa Petteri Noyranen, Helsinki (FI); Olli Antero Rantapuska, Vantaa (FI); Heiki Juhani Kokkinen, Helsinki (FI); Marcin Wieslaw Matuszewski, Warsaw (PL); Esko Mikael Kokkonen, Espoo (FI); Jyrki Tauno Johannes Porio, Vantaa (FI)

(73) Assignee: Nokia Corporation, Espoo (FI)

( * ) Notice: Subject to any disclaimer, the term of this patent is extended or adjusted under 35 U.S.C. 154(b) by 373 days.

(21) Appl. No.: 12/599,758

(22) PCT Filed: May 9, 2008

(86) PCT No.: PCT/FI2008/050259
§ 371 (c)(1),
(2), (4) Date: Aug. 4, 2010

(87) PCT Pub. No.: WO2008/139033
PCT Pub. Date: Nov. 20, 2008

(65) Prior Publication Data
US 2010/0312901 A1    Dec. 9, 2010

Related U.S. Application Data

(60) Provisional application No. 60/924,396, filed on May 11, 2007.

(51) Int. Cl.
*G06F 15/16* (2006.01)
*H04L 29/12* (2006.01)
*H04L 29/06* (2006.01)
*H04L 29/08* (2006.01)

(52) U.S. Cl.
CPC ...... *H04L 29/12509* (2013.01); *H04L 65/1006* (2013.01); *H04L 67/104* (2013.01); *H04L 65/1069* (2013.01)
USPC ........... 709/228; 709/227; 709/238; 709/245; 370/401; 370/351; 370/328

(58) Field of Classification Search
CPC ................ H04L 29/12509; H04L 41/0226; H04L 61/25; H04L 61/2567; H04L 61/2582; H04L 61/2503; H04L 61/2507; H04L 61/2514; H04L 61/2517; H04L 61/2528; H04L 61/2535; H04L 61/256; H04L 65/1006; H04L 65/169; H04L 67/104; H04L 67/1067
USPC .......... 709/228, 227, 238, 245; 370/401, 351, 370/328

See application file for complete search history.

(56) References Cited

U.S. PATENT DOCUMENTS 6,108,704 A    8/2000  Hutton et al.
7,746,851 B2 *  6/2010  Chandrasiri et al. .......... 370/389
(Continued)

FOREIGN PATENT DOCUMENTS

EP    1555786    7/2005

OTHER PUBLICATIONS

Rosenberg, J. (Cisco Systems), 'Interactive Connectivity Establishment (ICE): A Methodology for Network Address Translator (NAT) Traversal for Multimedia Session Establishment Protocols', IETF Standard-Working Draft, Internet Engineering Task Force, IETF, CH, Feb. 21, 2005, pp. 1-46.

(Continued)

*Primary Examiner* — Alina N Boutah
(74) *Attorney, Agent, or Firm* — Alston & Bird LLP

(57) ABSTRACT

The invention relates to a method where a first address (121) from a first network (185) is obtained to a mobile node (180). Network address translation information is received from a network node (140) to the mobile node (180), the network node (140) being connected to a second network (150). An address mapping is indicated between the first address (121) and a second address (101) to the network node (140), the second address (101) being associated with the second network (150). A session establishment request is obtained. The request comprises instances of the first addresses (121) and third addresses (120). The first addresses (121) are replaced with the second addresses (101) in the request. An address mapping is indicated between the third address (120) and a fourth address (100) to the first network node (140). The session establishment request is sent to a remote network node (190) from the mobile node (180).

20 Claims, 4 Drawing Sheets

(56) References Cited

U.S. PATENT DOCUMENTS

| | | |
|---|---|---|
| 2002/0138622 A1* | 9/2002 | Dorenbosch et al. ......... 709/227 |
| 2003/0026289 A1 | 2/2003 | Mukherjee et al. |
| 2003/0165121 A1* | 9/2003 | Leung et al. ................. 370/313 |
| 2004/0067761 A1 | 4/2004 | Pyhalammi et al. |
| 2004/0139230 A1* | 7/2004 | Kim ............................... 709/245 |
| 2004/0157590 A1 | 8/2004 | Lazaridis et al. |
| 2004/0209614 A1 | 10/2004 | Bright et al. |
| 2005/0049001 A1 | 3/2005 | Lazaridis |
| 2005/0060411 A1 | 3/2005 | Coulombe et al. |
| 2005/0114525 A1* | 5/2005 | Vimpari ......................... 709/228 |
| 2005/0141694 A1 | 6/2005 | Wengrovitz |
| 2005/0201357 A1* | 9/2005 | Poyhonen .................... 370/352 |
| 2006/0126594 A1 | 6/2006 | Tu |
| 2006/0165060 A1 | 7/2006 | Dua |
| 2006/0215684 A1* | 9/2006 | Capone ......................... 370/437 |
| 2007/0076729 A1* | 4/2007 | Takeda .......................... 370/401 |
| 2007/0115991 A1 | 5/2007 | Ramani et al. |
| 2007/0160034 A1* | 7/2007 | Koretsky ....................... 370/352 |
| 2007/0211702 A1 | 9/2007 | Doradla et al. |
| 2007/0223444 A1 | 9/2007 | Foo et al. |
| 2007/0253407 A1 | 11/2007 | Wang et al. |
| 2007/0253417 A1* | 11/2007 | Purnadi et al. ................ 370/392 |
| 2007/0274271 A1 | 11/2007 | Jones et al. |
| 2007/0276907 A1 | 11/2007 | Maes |
| 2008/0317036 A1* | 12/2008 | Chandrasiri et al. ....... 370/395.3 |
| 2009/0049164 A1* | 2/2009 | Mizuno ......................... 709/223 |
| 2009/0180476 A1* | 7/2009 | Lee et al. ...................... 370/392 |

OTHER PUBLICATIONS

"International Search Report and the Written Opinion of the International Searching Authority", received in corresponding PCT Application No. PCT/FI2008/050259, Dated Nov. 20, 2008, 36 pages.

International Preliminary Report on Patentability for International Application No. PCT/FI2008/050259, mailed Aug. 12, 2009.

* cited by examiner

METHOD FOR THE ESTABLISHING OF PEER-TO-PEER MULTIMEDIA SESSIONS IN A COMMUNICATION SYSTEM

RELATED APPLICATION

This application was originally filed as PCT Application No. PCT/FI2008/050259 filed May 9, 2008 which claims priority to US Provisional Application No. 60/924,396 filed May 11, 2007.

BACKGROUND OF THE INVENTION

1. Field of the Invention

The invention relates to the establishing of multimedia sessions. Particularly, the invention relates to a method for the establishing of peer-to-peer multimedia sessions in a communication system.

2. Description of the Related Art

Due to the lack of a sufficient number of Internet Protocol (IP) version 4 addresses several methods for address translation have been introduced. The common factor in these methods there is a logical separation of a physical network continuum to a first network and a second network, which are connected with a node that allocates addresses from the second network on demand for establishing communications between first and the second networks. The first network is assumed to be a network which may use IP addresses that overlap with the IP addresses in other networks, whereas the second network is a large network where the overlapping use of addresses is not an option due to the connectivity to other networks. The first network is usually a corporate network. The second network is usually a backbone network. One such method is referred to as the Network Address Translation (NAT). NAT is used to enable multiple hosts on the first network to access the Internet or generally the second network using a single IP address from the second network.

The problem associated with NAT is that nodes behind a NAT-enabled router, that is, the address allocating node, do not have true peer-to-peer connectivity with a remote party and cannot use some Internet protocols such as the Session Initiation Protocol (SIP) in a peer-to-peer fashion. Services that require the initiation of the Transmission Control Protocol (TCP) connections from the outside network or stateless protocols such as those using the User Datagram Protocol (UDP) may become disrupted due to the use of NAT. Unless a NAT-enabled router makes a specific effort to support these protocols, incoming packets cannot reach their destinations behind the NAT-enabled router. Sometimes application layer gateways are used to provide connectivity over a NAT-enabled router. In other words, the internal addresses for nodes in the first network are not visible for nodes in the second network.

In a pure peer-to-peer Session Initiation Protocol (SIP) environment a further problem is that the SIP messages may contain IP addresses and port numbers and a node in a first network has no way of knowing the addresses to be obtained from the second network. A benefit of being able to communicate in an end-to-end fashion would be to avoid large investments in Session Initiation Protocol servers and media stream proxies.

SUMMARY OF THE INVENTION

According to one aspect of the invention, there is provided a method comprising: obtaining a first address from a first network to a mobile node; receiving network address translation information from a first network node to said mobile node, said first network node being connected to a second network; indicating an address mapping between said first address and a second address to said first network node, said second address being associated with said second network; obtaining a session establishment request, said request comprising at least one first field comprising said first address and at least one second field comprising a third address; replacing said first address with said second address in said at least one first field; indicating an address mapping between said third address and a fourth address to said first network node, said fourth address being associated with said second network; and sending said session establishment request to a remote network node from said mobile node.

According to another aspect of the invention, there is provided a system comprising: an electronic device configured to receive a first address associated with a first network, to receive network address translation information from a first network node, said first network node being connected to a second network, to indicate an address mapping between said first address and a second address to said first network node, said second address being associated with said second network, to obtaining a session establishment request, said request comprising at least one first field comprising said first address and at least one second field comprising a third address, to replace said first address with said second address in said at least one first field, to indicate an address mapping between said third address and a fourth address to said first network node, said fourth address being associated with said second network and to send said session establishment request to a remote network node; and said first network node configured to send network address translation information from a first network node, to receive an address mapping between said first address and a second address, to store said address mapping between said first address and said second address, to receive an address mapping between said third address and a fourth address, and to store said address mapping between said third address and said fourth address.

According to one aspect of the invention, there is provided an electronic device, comprising: a network protocol entity configured to obtain a first address; and a session proxy entity configured to receive network address translation information, to indicate an address mapping between said first address and a second address, to obtain a session establishment request, said request comprising at least one first field comprising said first address and at least one second field comprising a third address, to replace said first address with said second address in said at least one first field, to indicate an address mapping between said third address and a fourth address and to submit said session establishment request for transmission to a remote network node.

According to one aspect of the invention, there is provided an electronic device, comprising: means for obtaining a first address; means for receiving network address translation information; means for indicating an address mapping between said first address and a second address; means for obtaining a session establishment request, said request comprising at least one first field comprising said first address and at least one second field comprising a third address; means for replacing said first address with said second address in said at least one first field; means for indicating an address mapping between said third address and a fourth address; and means for sending said session establishment request to a remote network node.

According to one aspect of the invention, there is provided a computer program embodied on a computer readable medium, the computer program comprising code for controlling a processor to execute a method comprising: obtaining a first address; receiving network address translation information; indicating an address mapping between said first address and a second address; obtaining a session establishment request, said request comprising at least one first field comprising said first address and at least one second field comprising a third address; replacing said first address with said second address in said at least one first field; indicating an address mapping between said third address and a fourth address; and sending said session establishment request to a remote network node.

According to one aspect of the invention, there is provided a computer program comprising code for controlling a processor to execute a method comprising: obtaining a first address; receiving network address translation information; indicating an address mapping between said first address and a second address; obtaining a session establishment request, said request comprising at least one first field comprising said first address and at least one second field comprising a third address; replacing said first address with said second address in said at least one first field; indicating an address mapping between said third address and a fourth address; and sending said session establishment request to a remote network node.

In one embodiment of the invention, the session proxy entity within the electronic device is configured to update said second address in a distributed hash table to be associated with a logical name. The logical name refers to a user of the electronic device. The logical name may be mapped in the distributed hash table to a public IP address and port number referring to the electronic device. The public IP address and port number are translated in the first node or generally in any network address translation entity to a private IP address and port number. The private IP address is used to route packets to the electronic device and the port number is used to direct the packet payload to the session proxy entity from a transport protocol entity. The distributed hash table may be maintained by a number of nodes in the second network or in the Internet.

In one embodiment of the invention, the session proxy entity within the electronic device is configured to obtaining a peer address from a distributed hash table.

In one embodiment of the invention, the session proxy entity within the electronic device is configured to insert at least one header to said session establishment request, said headers specifying said second address.

In one embodiment of the invention, the electronic device is configured to send said session establishment request from a session establishment entity within said electronic device to a session establishment proxy entity within said electronic device.

In one embodiment of the invention, the session proxy entity in the electronic device is configured to receive said fourth address. The first network node is configured to allocate said fourth address and to send said fourth address to said electronic device.

In one embodiment of the invention, the first network node comprises a network address translation enabled router. In one embodiment of the invention, the first network node comprises a network address translator, which may be a server connected to two the first network and the second network.

In one embodiment of the invention, at least one of said first address, second address, third address and fourth address comprises a port number and an internet protocol address. The fourth and second address may differ only with respect to port number.

In one embodiment of the invention, the session proxy entity in the electronic device configured to indicate the address mapping with a universal plug-and-play protocol or universal plug-and-play internet gateway device protocol message.

In one embodiment of the invention, the system further comprises: the electronic device configured to send at least one request message to at least one external server within said second network in order to determine said network address translation information; the at least one external server configured to send at least one response message to said electronic device; and said first network node configured to relay said at least one request message and said at least one response message and to translate addresses in said at least one request message and said at least one response message with at least one network address translation rule. The external server may be a Simple Traversal of User Datagram Protocol through Network Address Translators (STUN) server. Also universal plug-and-play internet gateway device protocol may be used.

In one embodiment of the invention, the network address translation information comprises an indication of a type comprising at least full cone, restricted cone and port restricted cone. The indication of the type may be an enumerated variable having different values representing full cone, restricted cone and port restricted cone, which are network address translation types, that is, methodologies.

In one embodiment of the invention, the fourth address is allocated from the first network node at the request from the mobile node. The allocated address is provided in response to the mobile node. The allocated address may be used to carry incoming media component stream to the application entity. The address allocation and receiving is performed by the session proxy entity, that is, the SIP proxy entity in the mobile node. The first network node may be a network address translator.

In one embodiment of the invention, the session proxy entity is a SIP proxy entity and the application protocol used in SIP.

In one embodiment of the invention, the electronic device comprises a mobile communication device. In one embodiment of the invention, the electronic device comprises a mobile station within a mobile communication network.

In one embodiment of the invention, the communication system comprises a packet switched network, for example, an Internet Protocol (IP) network. The first, second, third and fourth network addresses may be IP address and port number pairs.

In one embodiment of the invention, said communication system comprises a mobile communication network. In one embodiment of the invention, said mobile terminal comprises a mobile station. In one embodiment of the invention, the communication system comprises at least one of a Global System of Mobile Communications (GSM) network and a Universal Mobile Telephone System (UMTS) network. The mobile terminal may be, for example, a GSM mobile station or a UMTS mobile station with a dual mode or multimode functionality to support different access types.

In one embodiment of the invention, the computer program is stored on a computer readable medium. The computer readable medium may be a removable memory card, holographic memory, magnetic disk, optical disk or magnetic tape.

The embodiments of the invention described hereinbefore may be used in any combination with each other. Several of the embodiments may be combined together to form a further embodiment of the invention. A method, a communication system, an electronic device or a computer program to which the invention is related may comprise at least one of the embodiments of the invention described hereinbefore.

The benefits of the invention are related to improved efficiency in the establishing of sessions. The establishing of peer-to-peer sessions in network address translation environment is made possible without the use of specific application layer gateways.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
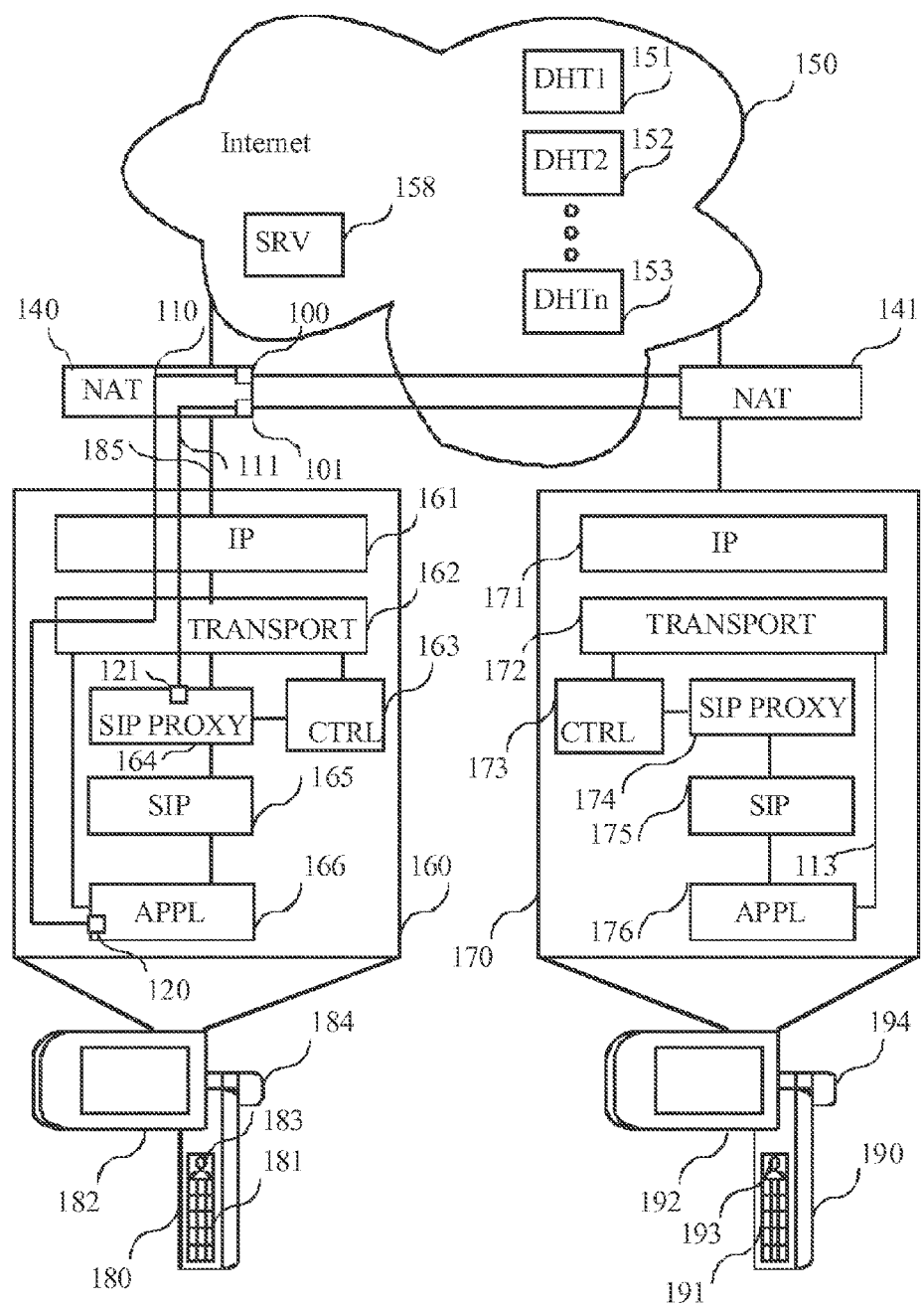
FIG. 1 is a block diagram illustrating a communication system comprising two mobile nodes in one embodiment of the invention.

FIG. 1 is a block diagram illustrating a communication system comprising two mobile nodes in one embodiment of the invention.

In FIG. 1 there are illustrated two mobile nodes, namely, a mobile node 180 and a mobile node 190. The mobile nodes may be mobile stations, computers, communicators or any other portable electronic devices. The internal functionalities of mobile nodes 180 and 190 are illustrated with boxes 160 and 170, respectively. These boxes illustrate software structure within mobile nodes 180 and 190. Mobile node 180 may be equipped with a keypad 181, a display 182, a pointer device 183 and a camera 184. The pointer device may be, for example, a mini-joystick or a trackball. The display is illustrated as being connected to a hinge rod that connects the display to the rest of the device. Thus the display may be rotated to display what the camera is capturing. Other structures are possible.

In FIG. 1 there is also illustrated a network address translator 140 and a network address translator 141. Mobile node 180 communicates with network address translator 140 and mobile node 190 communicates with network address translator 141. For example, mobile node 180 is connected to a private network, in other words, a first network together with network address translator 140. Network address translator 140 and 141 communicate with an internet 150, in other words, a second network. By internet 150 is here in meant arbitrary internet protocol network which may be the Internet or an organizational or corporate intranet. Internet 150 comprises a number of servers storing a distributed hash table. The distributed hash table is stored on a server 151, a server 152 and a server 153. The number of servers storing the distributed hash table may be arbitrary as indicated with the letter N, which stands for an arbitrary natural number other than zero. Mobile node 180 has an IP entity 161, a transport protocol entity 162 and a SIP proxy entity 164. There is also a SIP protocol entity 165 and a control entity 163. There is also an application entity 166. Application entity 166 comprises user interface functionality, phonebook functionality and all high-level session control functions regarding the setup of multimedia sessions. In order to establish a session to a remote party, application entity 166 sends a request to SIP protocol entity 165. SIP protocol entity 165 forms a SIP Invite message that is sent to a remote node via SIP proxy entity 164 and via transport protocol entity 162 and IP protocol entity 161. SIP protocol entity 165 takes care of all registration related tasks by which mobile node 180 is registered to a distributed hash table in internet 150. Control entity 163 is used by SIP proxy entity 164 to communicate with network address translator 140 and also a number of other external servers. The external servers are used in determination of network address translation type. Transport protocol entity 162 may be a Transmission Control Protocol (TCP) entity, a User Datagram Protocol (UDP) entity or a Stream Transmission Control Protocol (SCTP) entity. Control entity 163 comprises, for example, a Hypertext Transfer Protocol (HTTP) entity for communicating with network address translator 140.

In FIG. 1 there are shown two pairs, each pair comprising a public address and a port number, namely pairs 100 and 101. There are also two private address and port number pairs, namely pairs 120 and 121. Pairs 100 and 101 are mapped to pairs 120 and 121, respectively. The mapping is performed by network address translator 140. The mappings are represented by two incoming packet streams, namely a stream 110 and a stream 111. The streams are the final connection segment in a first network 185 comprising mobile node 180 and network address translator 140. Stream 111 represents signaling, whereas stream 110 represents a media component, namely, a media stream to application entity 166.

The mapping may be formed, for example, so that the address part from first pair 121 is obtained from a first network 185 to mobile node 180. The port number part from first pair 121 is determined in mobile node 180. Network address translation information is received from network address translator 140 to mobile node 180, network address translator 140 being connected also to second network 150, namely, internet 150. An address mapping 111 between first pair 121 and a second pair 101 is indicated or requested to network address translator 140, second pair 101 being associated with second network 150. A session establishment request is obtained, the request comprising at least one first field comprising first pair 121 and at least one second field comprising a third pair 120. First pair 121 is replaced with second pair 101 in the at least one first field. An address mapping 110 between the third pair 100 and a fourth pair 120 is indicated to the first network node, the fourth pair 120 being associated with the second network. A session establishment request is sent to a remote network node such as mobile node 190 from mobile node 180.

In FIG. 1 mobile node 190 has similar functionalities as mobile node 180. Mobile node 190 has a keypad 191, a display 192, a pointer device 193 and a camera 194. The software within mobile node 190 comprises an IP protocol entity 171, a transport protocol entity 172, a control entity 173, a SIP proxy entity 174, a SIP protocol entity 175 and an application entity 176.

Figure 2:
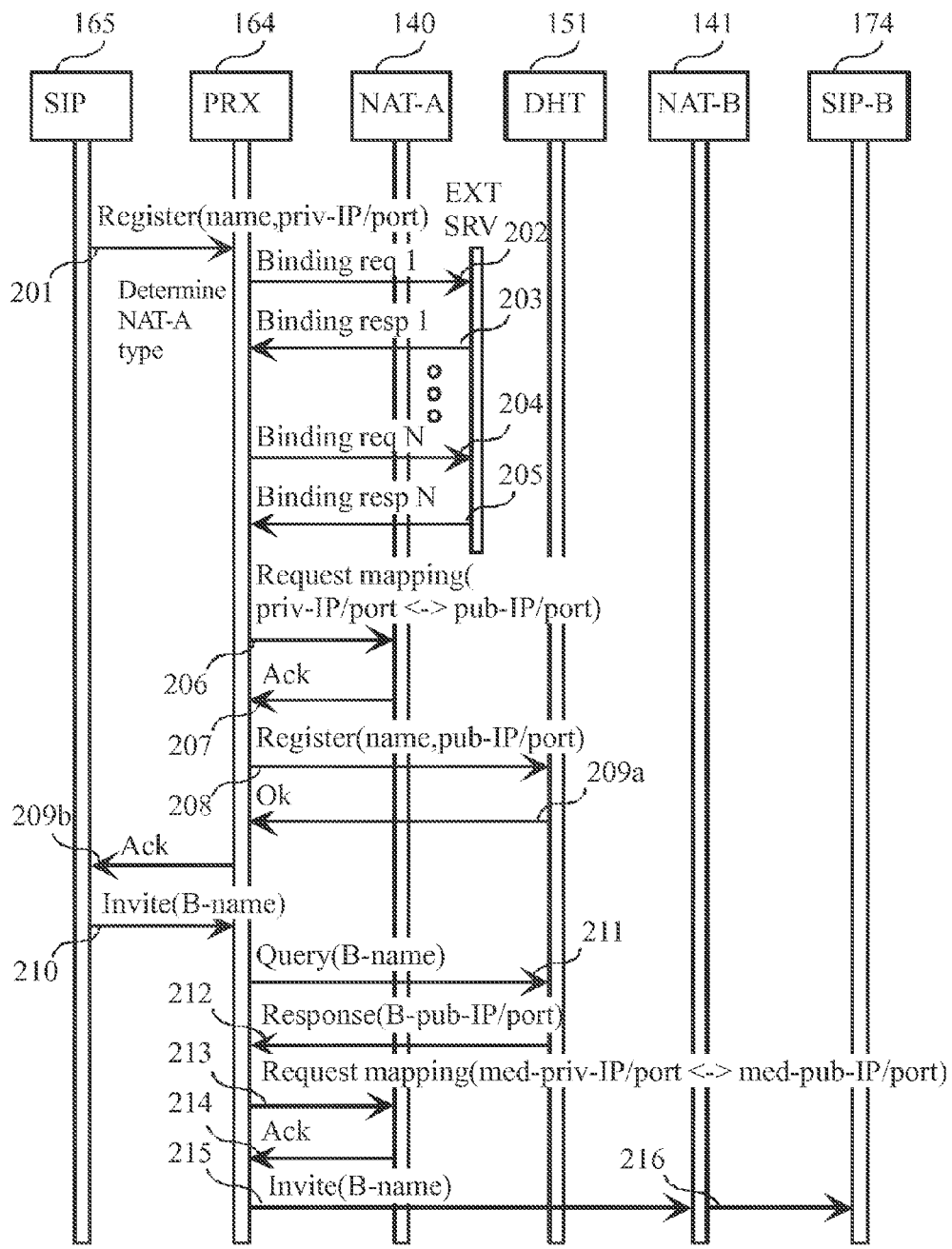
FIG. 2 is a block diagram illustrating a surveillance system in one embodiment of the invention.

FIG. 2 is a message sequence chart illustrating the establishing of transparent routing and session initiation in one embodiment of the invention. FIG. 2 illustrates internal messaging between entities within mobile node 180 and external signaling with other nodes. In FIG. 2 there is illustrated SIP protocol entity 165, SIP proxy entity 164, network address translator 140, distributed hash table server 151, network address translator 141 and SIP proxy entity 174 as shown also in FIG. 1. The starting point in FIG. 2 is that mobile node 180 from FIG. 1 is powered on. Mobile node 180 obtains an internal IP address, that is, a private IP address, for example, from a Dynamic Host Configuration Protocol (DHCP) server. In order to be able to receive incoming SIP sessions to mobile node 180, SIP protocol entity 165 sends a register message to SIP proxy entity 164 as illustrated with arrow 201. The register message comprises the logical name for a user within mobile node 180 and the private IP address and port number. For receiving incoming SIP sessions or for the sending of outgoing SIP sessions. Thereupon, the type of network address translation performed by network address translation entity 140 is determined by SIP proxy entity 164. The determination of network address translation type may involve the sending of a number of binding request messages to at least one external server beyond network address translation entity 140. A first binding server request message from SIP proxy entity 164 to external server 158 is illustrated with arrow 202. The response is illustrated with arrow 203. A subsequent binding request from SIP proxy entity 164 to external server 158 is illustrated with arrow 204. The response is illustrated with arrow 205. Thereupon, SIP proxy entity 164 determines whether peer-to-peer SIP sessions are possible from the current network. The determination is made based on the network address translation type.

Assuming that peer-to-peer SIP session are possible, SIP proxy entity 164 sends a request mapping message to network address translator 140 as illustrated with arrow 206. The request mapping message comprises information on a private IP address and port number, and the public IP address and port number. A pair comprising a private IP address and a port number is mapped to a pair comprising a public IP address and a port number, respectively, in outgoing SIP requests. Inverse mapping may be applied in the case of incoming SIP requests. The mapping request is acknowledged by network address translator 140 to SIP proxy entity 164, as illustrated with arrow 207. Upon now having a public IP address and port number referring to mobile node 180, SIP proxy entity 164 may now send a SIP register message to distributed hash table server 151. The register message comprises the logical name, that is used to refer to the user of mobile node 180, and the public IP address and port number to communicate with the SIP user agent in mobile node 180. The distributed hash table is use to resolve logical name to the public IP address and port number. The registration is acknowledged with an acknowledge message from distributed hash table server 151 to SIP proxy entity 164, as illustrated with arrow 209a. DHT may use its own protocol and is not dependent on the SIP. In one embodiment of the invention, after getting a successful PUT acknowledgement from the DHT, SIP proxy entity 164 generates a SIP ACK and sends it to the SIP entity protocol entity 165, as illustrated with arrow 209b. At this point in the signaling, it maybe assumed that similar signaling messages have been sent by the entities in mobile node 190. Therefore, the signaling phase for mobile node 190 is equivalent to the signaling phase in mobile node 180. At some point in time, SIP protocol entity 165 sends a SIP invite message to SIP proxy entity 164, as illustrated with arrow 210. The invite message comprises the logical name associated with the called party, namely, "B name". The SIP invite message 210 may also comprise a number of session description protocol blocks, which comprise information on at least one media stream and the IP addresses and port numbers associated with these media streams. SIP proxy entity 164 sends a query message to distributed hash table server 151, as illustrated with arrow 211. The query message comprises the logical name i.e. "B name". A response message sent by distributed hash table server 151 to SIP proxy entity 164, as illustrated with arrow 212, comprises the public IP address and port number for the called party, that is, B-public IP address and port number, as illustrated. Thereupon, SIP proxy entity 164 sends a request mapping message to network address translator 140, as illustrated with arrow 213. The request mapping message comprises a private IP address and a port number associated with a media component and a public IP address and a port number for the media component. The mapping is performed for incoming UDP/RTP messages received to the public IP address and port number of the media component. The request mapping is acknowledged by network address translator 140 to SIP proxy entity 164 as illustrated with arrow 214. Thereupon, SIP proxy entity 164 may translate the IP addresses and port numbers in the session description protocol blocks in accordance with the requested mapping. Thereupon, SIP proxy entity 164 sends a SIP invite message to network address translator 141, as illustrated with arrow 215. The SIP Invite message comprises B-name and session description protocol blocks translated regarding the IP addresses. The SIP invite message is sent from network address translator 141 to SIP proxy entity 174, as illustrated with arrow 216.

In one embodiment of the invention, the binding request and response message pairs with at least one external server, as illustrated with arrows from 202 to 205 are replaced with a signal request and response message pair. The purpose of this messaging is to obtain a direct indication concerning the type of network address translation performed.

In one embodiment of the invention, SIP proxy entity 164 is made aware of the type of network address translation occurring in the network, for example, from a DHCP server. Therefore, the messages illustrated with arrows from 202 to 205 may be omitted altogether.

Figure 3:
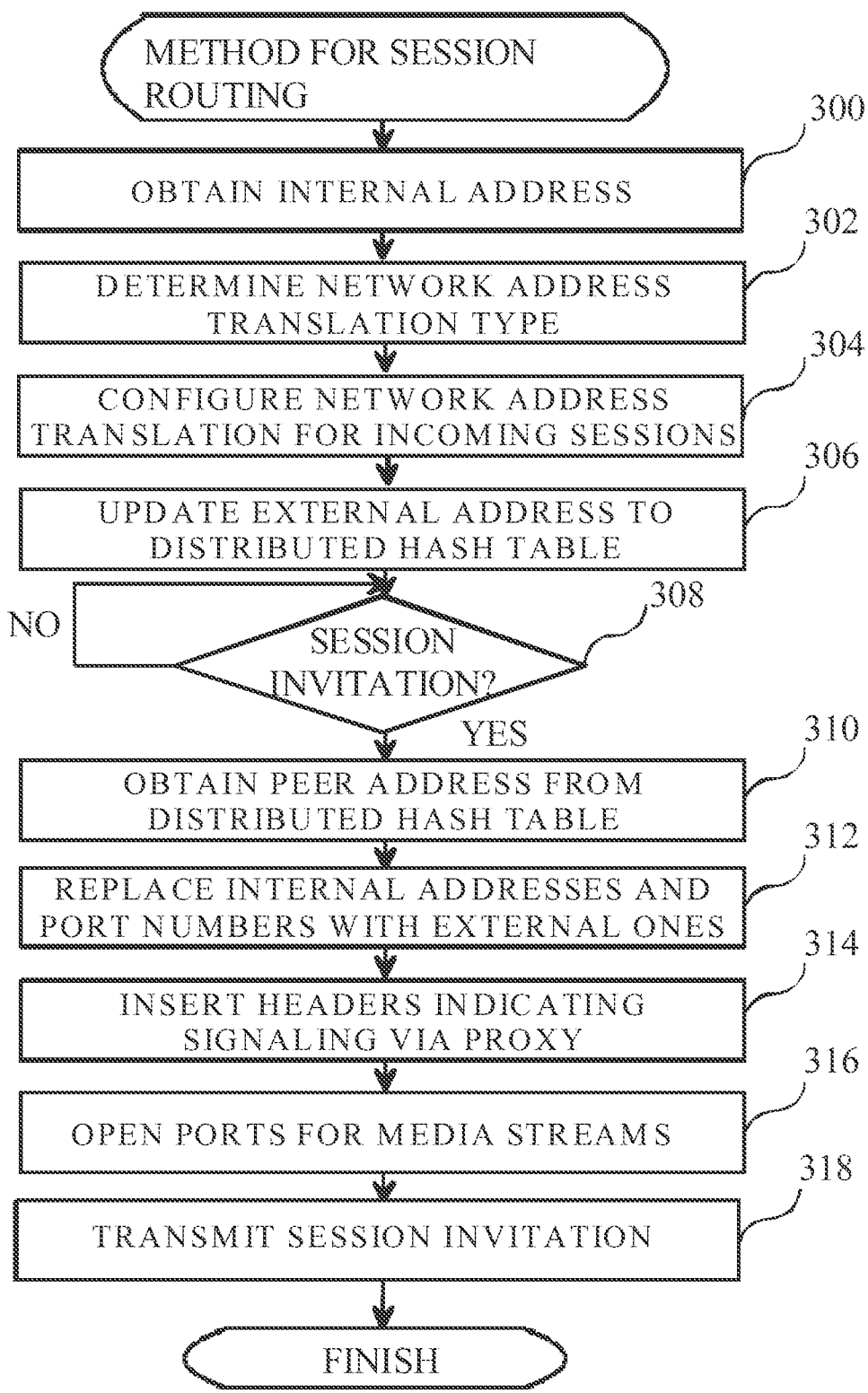
FIG. 3 is a flow chart illustrating a method for session routing in one embodiment of the invention.

FIG. 3 is a flow chart illustrating a method for session routing in one embodiment of the invention.

At step 300, an internal address is obtained by a mobile node.

In one embodiment of the invention the internal address is obtained from a dynamic host configuration protocol server.

At step 302, network address translation type is determined by the mobile node.

One purpose for the termination is to find out whether public IP addresses and port numbers are preserved between different requests to different external servers regarding a given internal address and port number.

At step 304, network address translation is configured to enable incoming sessions via a network translation entity to the mobile node. This involves, for example, the building of mapping between private IP addresses and port numbers and public IP addresses and port numbers.

At step 306, external IP address and port are updated to a distributed hash table.

At step 308, it is determined weather a session invitation is to be started. If there is no session invitation to be started the method continues at step 308. Otherwise the method continues at step 310.

At step 310, a peer address is obtained from the distributed hash table. The purpose of distributed hash table is to map logical names to public IP addresses and port numbers.

At step 312, internal IP addresses and port numbers are replaced inside the SIP invite message with external corresponding IP addresses and port numbers.

At step 314, headers indicating signaling via a proxy entity are inserted to the SIP invite message.

At step 316, ports are opened for incoming media streams regarding the SIP session. The ports are opened from a network address translator node. The appropriate network address translation and port number mapping rules are provided to the network address translator node.

Steps 312, 314 and 316 may be performed in any order.

At step 318, the session invitation message is transmitted further towards the destination address obtained using the called party logical name.

Figure 4:
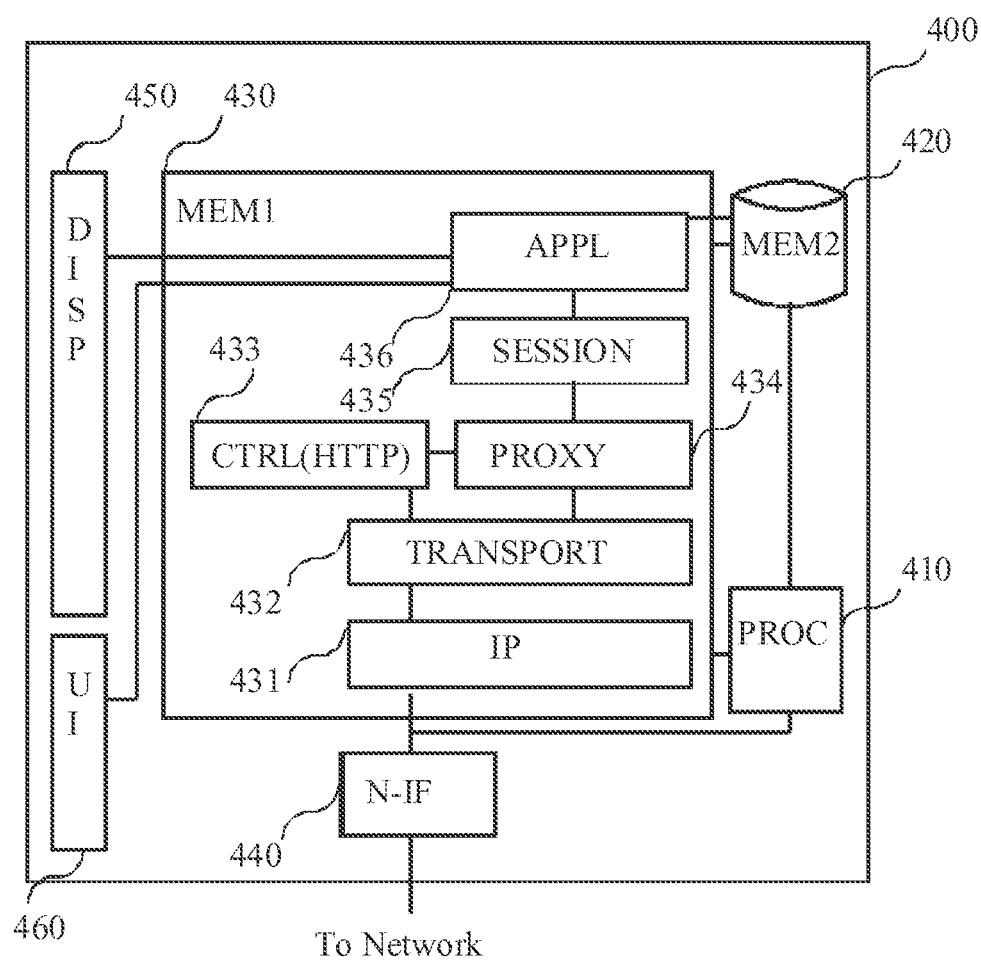
FIG. 4 is a block diagram illustrating an electronic device in one embodiment of the invention.

FIG. 4 is a block diagram illustrating an electronic device in one embodiment of the invention.

The electronic device may be a mobile node such as mobile node 180 illustrated in FIGS. 1 and 2. The mobile station may be a mobile telephone, a personal digital assistant (PDA), a digital camera or a camcorder or any combination of the aforementioned. In FIG. 4 there is an electronic device 400. Electronic device 400 comprises a processor 410 and a secondary memory 420. The secondary memory may be, for example, a hard disk or a flash memory or an optic disk. Electronic device 400 comprises also a primary memory 430. When processor 410 executes functionalities associated with the invention primary memory 430 comprises, for example, a network protocol entity 431, a transport protocol entity 432, a control entity 433, a session proxy entity 434, a session establishment protocol entity 435 and application entity 436. The session proxy entity may be, for example, a SIP proxy entity or a proxy entity for any protocol used to set-up communications between two peer network nodes. Session establishment protocol entity sends session establishment requests to transport protocol entity 432 via session proxy entity 434. Similarly, incoming session messages received to transport protocol entity 432 are sent to session establishment protocol entity 435 via session proxy entity 434. Electronic device also comprises one or more network interface units such as network interface unit 440, a display unit 450, a user interface unit 460. The user interface unit may comprise, for example, a keypad, a keyboard and a pointer device. Network interface 440 may be, a radio interface comprising, for example, a Wireless Local Area Network (WLAN) interface, a Bluetooth interface, a Wimax interface, a UWB (ultra wide band), low power radio frequency interface and a radio interface for a mobile telecommunication network.

In one embodiment of the invention, network protocol entity 431 is comprised in the operating system of electronic device 400. The entities within electronic device 400 in FIG. 4, such as network protocol entity 431, transport protocol entity 432, control entity 433, session proxy entity 434, session establishment protocol entity 435 and application entity 436 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity. The entities in FIG. 4 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (e.g., voice, modem, and the like), wireless communications media, one or more wireless communications networks, cellular communications networks, G3 communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include non-transitory media including, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
   obtaining a first address from a first network to a network protocol entity within a mobile node, said first address comprising an internet protocol address and a port number, wherein the first address is a private address of the mobile node within the first network;
   receiving network address translation information regarding network address translation between the first network and a second network from a first network node to a session proxy entity within said mobile node;
   configuring an address mapping between said first address and a second address to said first network node from said session proxy entity, said second address being a public address comprising an internet protocol address and a port number;
   processing a session establishment request at said session proxy entity in said mobile node, said request comprising at least one first field comprising said first address and at least one second field comprising a third address, said third address comprising an internet protocol address and a port number;
   replacing said first address with said public second address in said at least one first field by said session proxy entity;
   configuring an address mapping between said third address and a fourth address to said first network node from said session proxy entity, said fourth address being a public address comprising an internet protocol address and a port number; and
   initiating a sending of said session establishment request to a remote network node from said session proxy entity within said mobile node.

2. The method according to claim 1, the method further comprising:
   updating said second address in a distributed hash table to be associated with a logical name.

3. The method according to claim 1, the method further comprising:
   obtaining a peer address from a distributed hash table.

4. The method according to claim 1, wherein the method further comprises:
   inserting at least one header to said session establishment request, said headers specifying said second address.

5. The method according to claim 1, the method further comprising:
   receiving said fourth address from said first network node to said mobile node.

6. The method according to claim 1, wherein said first node comprises a network address translation enabled router.

7. The method according to claim 1, wherein said indication of said address mapping uses the universal plug-and-play protocol.

8. The method according to claim 1, wherein said determining of said network address translation information uses at least one external server within said second network.

9. The method according to claim 1, wherein said network address translation information comprises an indication of a type comprising at least full cone, restricted cone and port restricted cone.

10. A system, comprising:
    a mobile node comprising an electronic device, the electronic device comprising a hardware processor configured:
    to obtain a first address from a first network to a network protocol entity within said electronic device, said first address comprising an internet protocol address and a port number, wherein the first address is a private address of the mobile node within the first network,
    to receive network address translation information regarding network address translation between the first network and a second network from a first network node to a session proxy entity within said electronic device,
    to request forming an address mapping between said first address and a second address in said first network node from said session proxy entity, said second address being a public address comprising an internet protocol address and a port number,
    to process a session establishment request at said session proxy entity within the electronic device, said request comprising at least one first field comprising said first address and at least one second field comprising a third address, said third address comprising an internet protocol address and a port number,
    to replace said first address with said public second address in said at least one first field by said session proxy entity,
    to request forming an address mapping between said third address and a fourth address in said first network node from said session proxy entity, said fourth address being a public address comprising an internet protocol address and a port number, and
    to initiate a sending of said session establishment request to a remote network node from said session proxy entity within said electronic device; and
    said first network node configured to send network address translation information from a first network node, to receive a request for an address mapping between said first address and said public second address, to store said address mapping between said first address and said second address, to receive a request for an address mapping between said third address and said public fourth address, and to store said address mapping between said third address and said public fourth address.

11. The system according to claim 10, the system further comprising:
    the electronic device configured to update said second address in a distributed hash table to be associated with a logical name.

12. The system according to claim 10, the system further comprising:
    the electronic device configured to obtaining a peer address from a distributed hash table.

13. The system according to claim 10, the system further comprising:
    The electronic device configured to inserting at least one header to said session establishment request, said headers specifying said second address.

14. The system according to claim 10, the system further comprising:

said electronic device configured to receive said fourth address; and said first network node configured to allocate said fourth address and to send said fourth address to said electronic device.

15. The system according to claim 10, wherein said first node comprises a network address translation enabled router.

16. The system according to claim 10, the system further comprising:
said electronic device configured to indicate said address mapping with a universal plug-and-play protocol message.

17. The system according to claim 10, the system further comprising:
said electronic device configured to send at least one request message to at least one external server within said second network in order to determine said network address translation information;
said at least one external server configured to send at least one response message to said electronic device; and
said first network node configured to relay said at least one request message and said at least one response message and to translate addresses in said at least one request message and said at least one response message with at least one network address translation rule.

18. The system according to claim 10, wherein said network address translation information comprises an indication of a type comprising at least full cone, restricted cone and port restricted cone.

19. An apparatus, comprising:
a hardware processor configured to be embodied within a mobile node; and
a memory including computer program code;
the memory and the computer program code configured to, with the hardware processor, cause the apparatus at least to:
obtain a first address from a first network, the first address comprising an internet protocol address and a port number, wherein the first address is a private address of the mobile node within the first network,
receive network address translation information regarding network address translation between the first network and a second network from a first network node,
configure an address mapping between said first address and a second address to said first network node, said second address being a public address comprising an internet protocol address and a port number,
process a session establishment request, said request comprising at least one first field comprising said first address and at least one second field comprising a third address, said third address comprising an internet protocol address and a port number,
replace said first address with said public second address in said at least one first field,
configure an address mapping between said third address and a fourth address to said first network node, said fourth address being a public address comprising an internet protocol address and a port number, and
initiate a sending of said session establishment request to a remote network node.

20. A computer program embodied on a non-transitory computer readable medium, the computer program comprising code for controlling a processor to execute a method comprising:
obtaining a first address from a first network to a network protocol entity within a mobile node, said first address comprising an internet protocol address and a port number, wherein the first address is a private address of the mobile node within the first network;
receiving network address translation information regarding network address translation between the first network and a second network from a first network node to a session proxy entity within said mobile node;
configuring an address mapping between said first address and a second address to said first network node from said session proxy entity, said second address being a public address comprising an internet protocol address and a port number;
processing a session establishment request at said session proxy entity in said mobile node, said request comprising at least one first field comprising said first address and at least one second field comprising a third address, said third address comprising an internet protocol address and a port number;
replacing said first address with said public second address in said at least one first field by said session proxy entity;
configuring an address mapping between said third address and a fourth address to said first network node from said session proxy entity, said fourth address being a public address comprising an internet protocol address and a port number; and
initiating a sending of said session establishment request to a remote network node from said session proxy entity within said mobile node.

* * * * *

UNITED STATES PATENT AND TRADEMARK OFFICE
CERTIFICATE OF CORRECTION

PATENT NO.       : 8,725,883 B2  
APPLICATION NO.  : 12/599758  
DATED            : May 13, 2014  
INVENTOR(S)      : Noyranen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Twenty-ninth Day of September, 2015

Michelle K. Lee
*Director of the United States Patent and Trademark Office*